US012683488B2

(12) United States Patent
Wang et al.

(10) Patent No.: US 12,683,488 B2
(45) Date of Patent: Jul. 14, 2026

(54) INDUCTOR, POWER FACTOR CORRECTION CIRCUIT, AND POWER SUPPLY SYSTEM

(71) Applicant: Huawei Digital Power Technologies Co., Ltd., Shenzhen (CN)

(72) Inventors: Jun Wang, Xi'an (CN); Shaolei Chen, Kista (SE); Chuangpeng Li, Xi'an (CN); Dongsheng Zhao, Xi'an (CN); Chenglong Ma, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 187 days.

(21) Appl. No.: 18/655,778

(22) Filed: May 6, 2024

(65) Prior Publication Data

US 2024/0291382 A1 Aug. 29, 2024

Related U.S. Application Data

(63) Continuation of application No. PCT/CN2023/071195, filed on Jan. 9, 2023.

(30) Foreign Application Priority Data

Jan. 10, 2022 (CN) .......................... 202210021903.2

(51) Int. Cl.
H02M 1/42 (2007.01)
H01F 27/24 (2006.01)
(Continued)

(52) U.S. Cl.
CPC .......... H02M 1/4208 (2013.01); H01F 27/24 (2013.01); H01F 27/28 (2013.01); H02M 7/06 (2013.01)

(58) Field of Classification Search
CPC ........ H01F 27/24; H01F 27/28; H01F 27/266; H01F 27/306; H01F 37/00; H02M 1/4208
See application file for complete search history.

(56) References Cited

U.S. PATENT DOCUMENTS 8,120,457 B2 * 2/2012 Hu .......................... H01F 29/14
336/178
9,093,212 B1 7/2015 Pinkerton et al.
(Continued)

FOREIGN PATENT DOCUMENTS

CN 205194476 U 4/2016
CN 113363059 A 9/2021
(Continued)

*Primary Examiner* — Sisay G Tiku
(74) *Attorney, Agent, or Firm* — Maier & Maier, PLLC

(57) ABSTRACT

An inductor, a power factor correction circuit, and a power supply system. The inductor includes a coil winding and a magnetic core. The magnetic core includes a first outer magnetic core, a second outer magnetic core, and a winding unit. The first outer magnetic core and the second outer magnetic core are disposed opposite to each other in a first direction, the winding unit is disposed between the first outer magnetic core and the second outer magnetic core, and the coil winding is disposed around the winding unit. The winding unit includes a magnetic core middle column and at least two air-gaps distributed in the first direction. The inductor can improve the operating efficiency of the power factor correction circuit and can optimize efficiency of the power supply system in the light load phase.

20 Claims, 11 Drawing Sheets

(51) Int. Cl.
     *H01F 27/28*      (2006.01)
     *H01F 27/30*      (2006.01)
     *H01F 37/00*      (2006.01)
     *H02M 7/06*       (2006.01)

(56)                  References Cited

U.S. PATENT DOCUMENTS

2012/0206230 A1*   8/2012  Liao ..................... H01F 27/263
                                                           336/192
2015/0302968 A1*  10/2015  Lin ......................... H01F 27/24
                                                            336/83
2021/0210271 A1*   7/2021  Ji ............................. H01F 27/28
2025/0055367 A1*   2/2025  Sun ..................... H02M 3/1586
2025/0286474 A1*   9/2025  Chen ........................ H01F 3/14

FOREIGN PATENT DOCUMENTS

CN          114530316  A      5/2022
CN          115359997  A  *  11/2022   ............. H01F 27/34
WO         2021258352  A1    12/2021

* cited by examiner

42

42

42

INDUCTOR, POWER FACTOR CORRECTION CIRCUIT, AND POWER SUPPLY SYSTEM

CROSS-REFERENCE TO RELATED APPLICATIONS

This application is a continuation of International Application No. PCT/CN2023/071195, filed on Jan. 9, 2023, which claims priority to Chinese Patent Application No. 202210021903.2, filed on Jan. 10, 2022. The disclosures of the aforementioned applications are hereby incorporated by reference in their entireties.

TECHNICAL FIELD

The embodiments relate to the field of power supply technologies, an inductor, a power factor correction circuit, and a power supply system.

BACKGROUND

A power supply system is widely used in various power supplying scenarios such as servers, data centers, and base stations. To cope with an increasingly serious energy consumption problem with development of science and technologies, a higher requirement is imposed on operating efficiency of the power supply system, especially a higher requirement is imposed on operating efficiency of a power factor correction circuit in the power supply system. In a critical conduction mode, how to improve the operating efficiency of the power factor correction circuit is a key to improve efficiency of the power supply system currently.

SUMMARY

The embodiments provide an inductor, a power factor correction circuit, and a power supply system, so that the power supply system in a light load phase in a critical conduction mode has high operating efficiency, to improve power supply efficiency.

According to a first aspect, the embodiments provide an inductor, which may be used in a power factor correction circuit. The inductor includes a coil winding and a magnetic core. The magnetic core includes a first outer magnetic core, a second outer magnetic core, and a winding unit. The first outer magnetic core and the second outer magnetic core are disposed opposite to each other in a first direction, the winding unit is disposed between the first outer magnetic core and the second outer magnetic core, and the coil winding is disposed around the winding unit. The winding unit may include a magnetic core middle column and at least two air-gaps distributed in the first direction, and a direction of an axis of the magnetic core middle column is parallel to the first direction. The at least two air-gaps are for implementing segmental air-gaps of the magnetic core. The at least two air-gaps include one air air-gap and at least one solid air-gap. A magnetic induction intensity of the solid air-gap is greater than a magnetic induction intensity of the magnetic core middle column, and the magnetic induction intensity is a density of magnetic induction lines that pass through per unit area (the unit area is perpendicular to the first direction).

For the magnetic core, when a magnetic flux increases, the solid air-gap is to be in a magnetic flux saturation state earlier than the magnetic core middle column. When a magnetic flux in the solid air-gap is saturated, the magnetic flux in the solid air-gap attenuates rapidly, and the solid air-gap serves as an air air-gap. When the magnetic flux is small, the magnetic flux in the solid air-gap is not saturated, and the solid air-gap can be for magnetic conduction. In this case, a total air-gap of the entire magnetic core is equal to the air air-gap. When the magnetic flux gradually increases until the magnetic flux in the solid air-gap is saturated, the magnetic flux in the solid air-gap attenuates rapidly. Further, the solid air-gap serves as another air air-gap. In this case, the total air-gap of the entire magnetic core is equal to a sum of the air air-gap and the solid air-gap. In other words, a size of the total air-gap of the magnetic core may vary with magnitude of a current in the coil winding.

The inductor is used in the power factor correction circuit of a power supply system. When the power supply system is in a light load phase in a critical conduction mode, the air-gap of the inductor is equivalent to the air air-gap in an original structure, and an inductance of the inductor is large. This can reduce an on/off frequency of the power factor correction circuit, to reduce an on/off loss of a metal-oxide-semiconductor field-effect transistor (MOSFET) in the power factor correction circuit, that is, efficiency of the power supply system in the light load phase can be improved. As a load of the power supply system increases, the magnetic flux of the solid air-gap is saturated. The solid air-gap serves as the another air air-gap. In this case, the total air-gap is equal to the sum of the air air-gap and the solid air-gap. The total air-gap of the inductor increases, and the inductance of the inductor decreases, so that the on/off frequency of the power factor correction circuit can be increased. It can be understood that the magnetic core is used in the power supply system, so that the power factor correction circuit can have high operating efficiency when the power supply system is in the light load phase in the critical conduction mode. Consequently, the power supply system also has high efficiency in the light load phase. This improves efficiency of the power supply system and meets a high-efficiency power supply requirement.

A structure of the winding unit may be implemented in a plurality of manners. The magnetic core middle column may be fastened to the first outer magnetic core, and the air air-gap is formed between the magnetic core middle column and the second outer magnetic core. Alternatively, the magnetic core middle column is fastened to the second outer magnetic core, and the air air-gap is formed between the magnetic core middle column and the first outer magnetic core. Alternatively, the magnetic core middle column includes a first sub-column and a second sub-column, the first sub-column is fastened to the first outer magnetic core, the second sub-column is fastened to the second outer magnetic core, and the air air-gap is formed between the first sub-column and the second sub-column.

In some possible implementations, the air air-gap may be disposed adjacent to the solid air-gap.

In some possible implementations, the magnetic core middle column includes a plurality of inner magnetic cores, and the air air-gap and the solid air-gap are respectively disposed on two sides that are of an inner magnetic core and that are in the first direction.

A material of the solid air-gap may be a ferromagnetic body, a ferromagnetic powder, or may be another ferric oxide mixture.

In a possible implementation, a hollow region that penetrates through the solid air-gap in the first direction is in a center of the solid air-gap. The hollow region can help improve the magnetic induction intensity of the solid air-gap, so that the magnetic induction intensity of the solid air-gap is greater than the magnetic induction intensity of the magnetic core middle column. In addition, the solid air-gap of this structure is a closed ring, so that the solid air-gap can reduce an eddy current loss that is generated due to a leakage flux and that is on a surrounding coil, to improve power supply efficiency. The hollow region may be cylindrical, and the hollow region and the magnetic core middle column are coaxial. A circumferential surface of the solid air-gap is flush with a circumferential surface of the magnetic core middle column. This is convenient for the coil winding to be disposed around the winding unit. The solid air-gap may be bonded to the magnetic core middle column by using an adhesive, a bonding layer, or the like.

In a possible implementation, a radial size that is of the solid air-gap and that is perpendicular to the first direction is greater than a radial size that is of the magnetic core middle column and that is perpendicular to the first direction.

The first outer magnetic core includes a first base and two first side columns, and the two first side columns are fastened to the first base and extend towards the second outer magnetic core. The second outer magnetic core includes a second base and two second side columns, and the two second side columns are fastened to the second base and extend towards the first outer magnetic core. Two ends of the magnetic core middle column are respectively fastened to the first base and the second base, and the two first side columns and the two second side columns are connected through fitting in a one-to-one correspondence. The first outer magnetic core and the second outer magnetic core may be any one of an EE type magnetic core, an EP type magnetic core, a PQ type magnetic core, or an RM type magnetic core.

Because the total air-gap of the magnetic core in the inductor may vary as the load of the power supply system varies, when the power supply system is in the critical conduction mode, the inductance of the inductor may be large when the power supply system is in the light load phase and may be small when the power supply system is in a heavy load phase.

According to a second aspect, the embodiments further provide a power factor correction circuit, including a capacitor, a metal-oxide-semiconductor field-effect transistor switch, a diode, and the inductor. One end of the inductor is connected to an output end of a rectifier circuit and is configured to receive an output current of the rectifier circuit. The other end of the inductor is connected to an anode of the diode and one end of the metal-oxide-semiconductor field-effect transistor switch. A cathode of the diode is connected to a capacitor and an input end of a direct current voltage transformation circuit. When a power supply system is in a critical conduction mode, the metal-oxide-semiconductor field-effect transistor switch in the power factor correction circuit has a small loss when the power supply system is in a light load phase, so that the power factor correction circuit has high operating efficiency when the power supply system is in the light load phase in the critical conduction mode, and the power supply system also has high efficiency in the light load phase, to improve the efficiency of the power supply system.

According to a third aspect, the embodiments further provide a power supply system. The power supply system includes an alternating current/direct current conversion circuit, a direct current voltage transformation circuit, and a control circuit. The alternating current/direct current conversion circuit includes a rectifier circuit and the power factor correction circuit. When a power supply system is in a critical conduction mode, the power factor correction circuit has high operating efficiency when the power supply system is in a light load phase in the critical conduction mode. Consequently, the power supply system also has high efficiency in the light load phase. This improves the efficiency of the power supply system and meets a high-efficiency power supply requirement.

DETAILED DESCRIPTION OF EMBODIMENTS

Figure 1A:
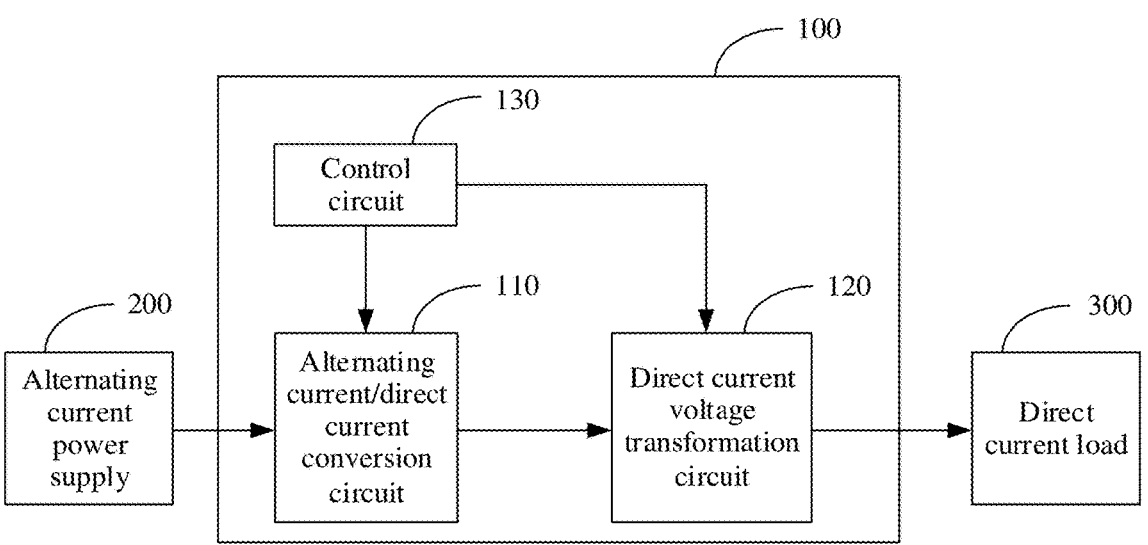
FIG. 1a is a schematic diagram of a power supply system.

FIG. 1a is a schematic diagram of a power supply system. The power supply system 100 is configured to: receive an alternating current provided by an alternating current power supply 200 and output a direct current to a direct current load 300. The direct current load 300 includes a server, a data center, a base station, a household appliance, or a lighting device. As shown in FIG. 1a, the power supply system 100 includes an alternating current/direct current (alternating current/direct current, AC/DC) conversion circuit 110, a direct current voltage transformation circuit 120, and a control circuit 130.

Figure 1B:
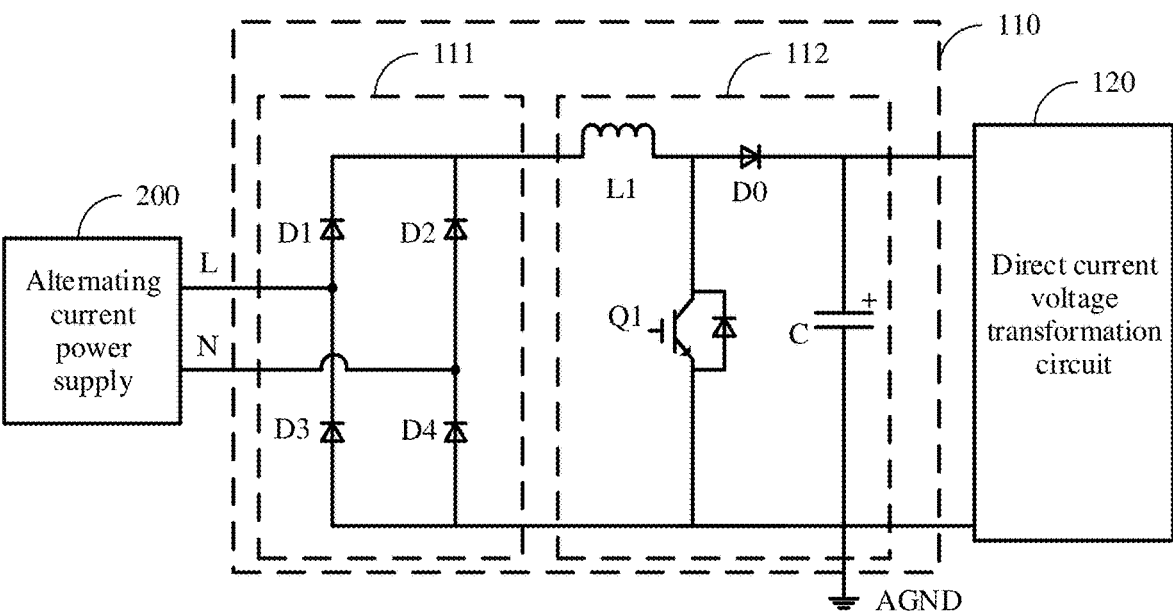
FIG. 1b is a schematic diagram of an alternating current/direct current conversion circuit.

FIG. 1b is a schematic diagram of the alternating current/direct current conversion circuit. As shown in FIG. 1b, the alternating current/direct current conversion circuit 110 includes a rectifier circuit 111 and a power factor correction (power factor correction, PFC) circuit 112. An input end of the alternating current/direct current conversion circuit 110 is connected to the alternating current power supply 200, and an output end of the alternating current/direct current conversion circuit 110 is connected to the direct current voltage transformation circuit 120 shown in FIG. 1*a*. The alternating current/direct current conversion circuit 110 is further provided with analog ground (AGND). An input end of the rectifier circuit 111 is connected to the alternating current power supply 200, and an output end of the rectifier circuit 111 is connected to the power factor correction circuit 112. The rectifier circuit 111 includes four diodes (D1, D2, D3, and D4), and each diode can allow an alternating current to flow through in a forward flow and block a current in a reverse flow of the current. The power factor correction circuit 112 includes an inductor L1, a capacitor C, a diode D0, and a metal-oxide-semiconductor field-effect transistor Q1. One end of the inductor L1 is connected to the output end of the rectifier circuit 111 and is configured to receive an output current of the rectifier circuit 111. The other end of the inductor L1 is connected to an anode of the diode D0 and one end of the metal-oxide-semiconductor field-effect transistor switch Q1. A cathode of the diode D0 is connected to the capacitor C and an input end of the direct current voltage transformation circuit 120. It may be understood that the inductor L1 stores energy when the metal-oxide-semiconductor field-effect transistor switch Q1 is conductive, and when the metal-oxide-semiconductor field-effect transistor switch Q1 is cut off, the inductor L1 charges the capacitor C through the diode D0 by using the energy stored when the metal-oxide-semiconductor field-effect transistor switch Q1 is conductive.

Figure 1C:
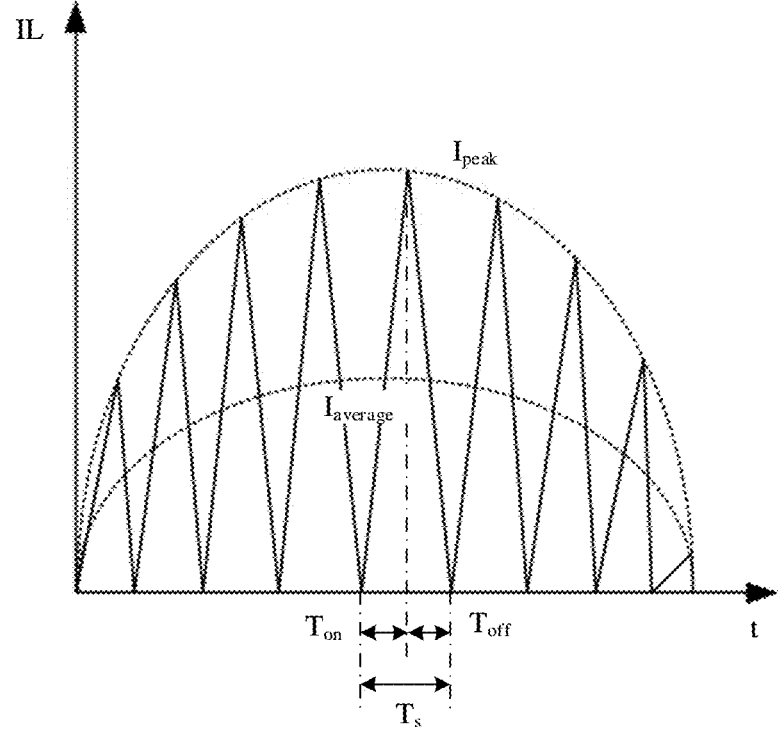
FIG. 1c is a diagram of a waveform of a current of an inductor of a power factor correction circuit shown in FIG. 1b in a critical conduction operating mode.

FIG. 1*c* shows a waveform (forward current) of a current of the inductor L1 in a half periodicity when the power factor correction circuit is in a critical conduction operating mode. In FIG. 1*c*, a horizontal coordinate is time t, and a vertical coordinate is a current I. The current of the inductor L1 is tooth-shaped with conduction duration of the metal-oxide-semiconductor field-effect transistor switch Q1. $T_{on}$ is a conduction time period of the metal-oxide-semiconductor field-effect transistor switch Q1. $T_{off}$ is a cut-off time period of the metal-oxide-semiconductor field-semiconductor switch Q1. $T_s$ is equivalent to an on/off periodicity of the metal-oxide-semiconductor field-effect transistor switch Q1. Peak values of the waveform of the current of the inductor L1 are connected, to form a curve $I_{peak}$. Peak values of the waveform of the current of the inductor L1 are connected, to form a curve $I_{average}$. The metal-oxide-semiconductor field-effect transistor switch Q1 may implement zero current/zero voltage conduction, and a conduction loss is small. The current of the inductor L1 is critically zero-crossing, so that the mode does not have a diode reverse recovery problem. However, the power factor correction circuit has a high on/off frequency in a light load phase, and an on/off loss of the metal-oxide-semiconductor field-effect transistor switch Q1 is large. A frequency of the metal-oxide-semiconductor field-effect transistor switch Q1 is related to three factors: an input voltage, an inductance of the inductor, and an output load. Under a condition that an input voltage and an output load current of the power supply are determined, the frequency of the metal-oxide-semiconductor field-effect transistor switch Q1 is determined by the inductance of the inductor in the power factor correction circuit. If the inductance of the inductor may be large in a light load phase and small in a heavy load phase, the frequency of the metal-oxide-semiconductor field-effect transistor switch Q1 in the light load phase may be reduced, and the on/off loss of the metal-oxide-semiconductor field-effect transistor Q1 may be reduced, to improve power supply efficiency.

A calculation formula of the inductance of the inductor is as follows:

$$L = \frac{\mu_0 \times N^2 \times A_e}{\delta}$$

Herein, $\rho_0$ indicates a vacuum magnetic permeability. $\mu_0 = 4\pi \times 10^{-7}$ H/m. N indicates a quantity of inductor turns. $A_e$ indicates an effective cross-sectional area of a magnetic core. $\delta$ indicates an air-gap of the magnetic core. After a coil winding and a magnetic core shape of the inductor are selected, N and $A_e$ may be considered as invariants, and a size of the air-gap $\delta$ becomes an only variable that affects the inductance of the inductor in the formula. An existing inductor includes a single-segment or segmental air-gap, the size of the air-gap is a fixed value, and magnitude of the inductance of the inductor cannot be adjusted by changing the size of the air-gap.

Based on this, the embodiments provide an inductor, a power factor correction circuit, and a power supply system, to resolve the foregoing problem. To make the objectives, solutions, and advantages clearer, the following further describes the embodiments in detail with reference to the accompanying drawings.

Terms used in the following embodiments are merely intended to describe embodiments but are not intended as limiting. The terms "one", "a", "the", "the foregoing", "this", and "the one" of singular forms are also intended to include an expression like "one or more", unless otherwise specified in the context clearly.

Reference to "an embodiment", "some embodiments", or the like indicates that one or more embodiments include a feature, structure, or characteristic described with reference to embodiments. Therefore, statements such as "in an embodiment", "in some embodiments", "in some other embodiments", and "in other embodiments" that appear at different places do not necessarily mean referring to a same embodiment. Instead, the statements mean "one or more but not all of embodiments", unless otherwise emphasized in another manner. The terms "include", "comprise", "have" and their variants all mean "include but are not limited to", unless otherwise emphasized in another manner.

Figure 2:
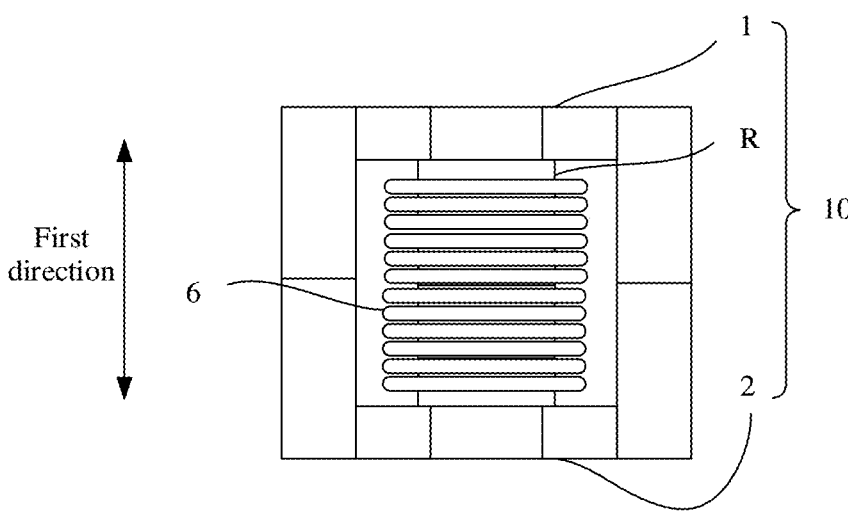
FIG. 2 is a schematic diagram of an inductor according to an embodiment.

FIG. 2 is a schematic diagram of an inductor according to an embodiment. As shown in FIG. 2, the inductor includes a magnetic core 10 and a coil winding 6. The magnetic core 10 includes a first outer magnetic core 1, a second outer magnetic core 2, and a winding unit R. The coil winding 6 is disposed around the winding unit R. It may be understood that the coil winding 6 may be a multi-strand wire, an excitation wire, a circuit board winding, or the like, and is not limited to examples herein. For ease of display, the coil winding 6 of the inductor is hidden in the following figures.

Figure 3A:
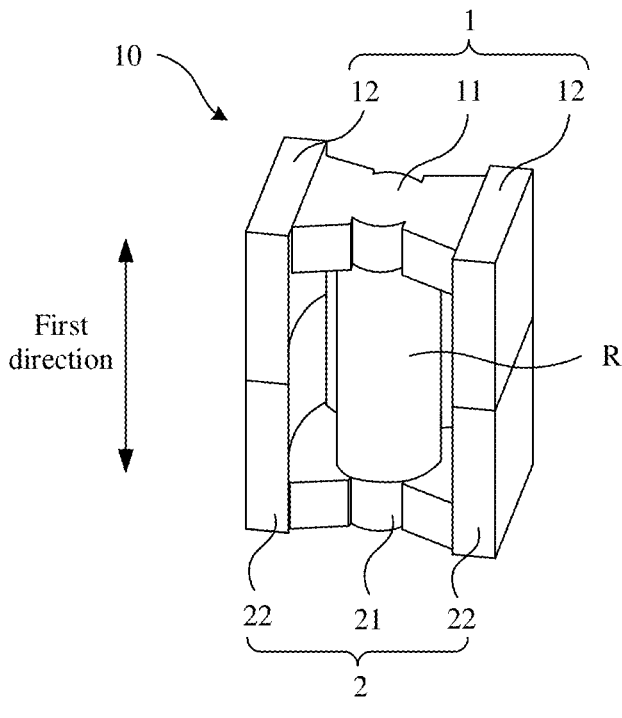
FIG. 3a is a schematic diagram of a structure of an inductor according to an embodiment.

FIG. 3*a* is a schematic diagram of a structure of an inductor according to an embodiment. For case of display, a coil winding 6 of the inductor is hidden in the figure. As shown in FIG. 3*a*, a magnetic core 10 includes a first outer magnetic core 1, a second outer magnetic core 2, and a winding unit R. The first outer magnetic core 1 and the second outer magnetic core 2 are disposed opposite to each other in a first direction, and the winding unit R is disposed between the first outer magnetic core 1 and the second outer magnetic core 2. It should be understood that the first direction herein includes a direction from the first outer magnetic core 1 to the second outer magnetic core 2, and also includes a direction from the second outer magnetic core 2 to the first outer magnetic core 1.

The first outer magnetic core 1 may include a first base 11 and two first side columns 12. The two first side columns 12 are fastened to the first base 11, and the two first side columns 12 extend towards the second outer magnetic core 2. Correspondingly, the second outer magnetic core 2 may include a second base 21 and two second side columns 22. The two second side columns 22 are fastened to the second base 21, and the two second side columns 22 extend towards the first outer magnetic core 1. In an implementation, the two first side columns 12 and the two second side columns 22 are connected through fitting in a one-to-one correspondence, and the first side column 12 may be connected to the corresponding second side column 22 in a fixed manner like bonding or clamping. The first base 11 and the two first side columns 12 in the first outer magnetic core 1 may be of an integrated structure, and the second base 21 and the second side columns 22 in the second outer magnetic core 2 may be of an integrated structure. In another implementation, the first side column 12 and the corresponding second side column 22 may be integrated, the first base 11 and the first side column 12 may be connected in a fixed manner like bonding or clamping, and the second base 21 and the second side column 22 may be connected in a fixed manner like bonding or clamping. It should be understood that, in this embodiment, there may be a gap at a joint between the first side column 12 and the second side column 22, a joint between the first base 11 and the first side column 12, and a joint between the second base 21 and the second side column 22. It may be understood that the first outer magnetic core 1 and the second outer magnetic core 2 in the accompanying drawings of embodiments are merely examples, and the first outer magnetic core 1 and the second outer magnetic core 2 may be any one of an EE type magnetic core, an EP type magnetic core, a PQ type magnetic core, or an RM type magnetic core. A material of the first outer magnetic core 1 and the second outer magnetic core 2 may be a ferromagnetic body or a ferromagnetic powder or may be another ferric oxide mixture like ferro-silicon-aluminum.

Figure 3B:
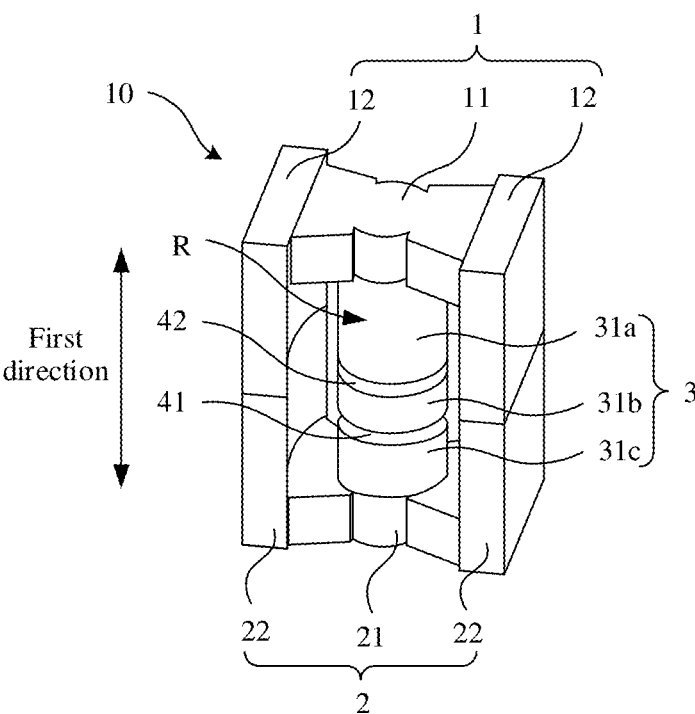
FIG. 3b is a schematic diagram of a structure of an inductor according to an embodiment.

FIG. 3b is a schematic diagram of a structure of an inductor according to an embodiment. For case of display, a coil winding 6 of the inductor is hidden in the figure. As shown in FIG. 3b, a winding unit R includes a magnetic core middle column 3 and at least two air-gaps. An axis of the magnetic core middle column 3 is parallel to the first direction. In an example, the at least two air-gaps are one air air-gap 41 and at least one solid air-gap 42. Still as shown in FIG. 3b, two ends that are of the magnetic core middle column 3 and that are in the first direction respectively fastened to a first base 11 and a second base 21. The magnetic core middle column 3 may be divided into at least three segments in the first direction, to form at least three inner magnetic cores (for example, a first inner magnetic core 31a, a second inner magnetic core 31b, and a third inner magnetic core 31c). The first inner magnetic core 31a is fastened to the first base 11, and the first inner magnetic core 31a and the first base 11 may be of an integrated structure. The third inner magnetic core 31c is fastened to the second base 21, and the third inner magnetic core 31c and the second base 21 may be of an integrated structure. The second inner magnetic core 31b is disposed between the first inner magnetic core 31a and the third inner magnetic core 3c. The solid air-gap 42 is disposed between the first inner magnetic core 31a and the second inner magnetic core 31b, and the air air-gap 41 is disposed between the second inner magnetic core 31b and the third inner magnetic core 31c. The air air-gap 41 and the solid air-gap 42 herein can implement segmentation of the magnetic core middle column 3, to reduce an eddy current loss generated by the coil winding wound around the magnetic core middle column 3.

In another embodiment, the air air-gap 41 may be disposed between the first inner magnetic core 31a and the second inner magnetic core 31b, and the solid air-gap 42 may be disposed between the second inner magnetic core 31b and the third inner magnetic core 31c. It may be understood that the air air-gap 41 and the solid air-gap 42 may be disposed between any two adjacent inner magnetic cores. A material of the magnetic core middle column 3 may be a ferromagnetic body or a ferromagnetic powder or may be another ferric oxide mixture like ferro-silicon-aluminum. A material of the solid air-gap 42 may be a ferromagnetic body, or may be a ferromagnetic powder, or may be another ferric oxide mixture like ferro-silicon-aluminum.

Figure 3C:
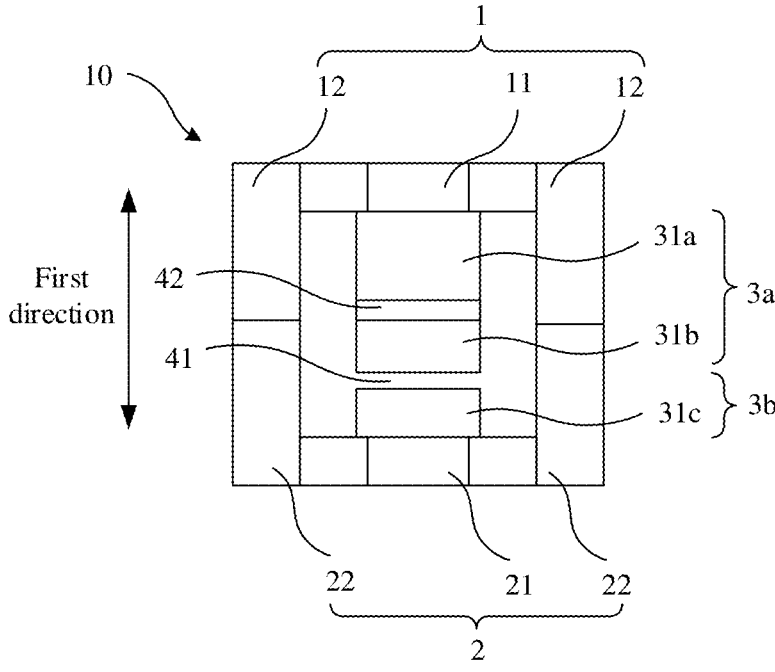
FIG. 3c is a main view of an inductor according to an embodiment.

FIG. 3c is a main view of an inductor according to an embodiment. For case of display, a coil winding 6 of the inductor is hidden in the figure. As shown in FIG. 3c, the first outer magnetic core 1 and the second outer magnetic core 2 are disposed opposite to each other in the first direction. The first outer magnetic core 1 includes the first base 11 and the two first side columns 12 connected to two sides of the first base 11, and the second outer magnetic core 2 includes the second base 21 and the two second side columns 22 connected to the second base 21. The winding unit R includes the magnetic core middle column 3, the air air-gap 41, and the solid air-gap 42. The magnetic core middle column 3 includes a first sub-column 3a and a second sub-column 3b, the first sub-column 3a is fastened to the first base 11, and the second sub-column 3b is fastened to the second base 21. The air air-gap 41 is disposed between the first sub-column 3a and the second sub-column 3b, and the solid air-gap 42 is disposed on the first sub-column 3a. It may be understood that the air air-gap 41 divides the magnetic core middle column 3 into the first sub-column 3a (such as the first inner magnetic core 31a and the second inner magnetic core 31b) and the second sub-column 3b (such as the third inner magnetic core 31c). The magnetic core middle column 3 includes the first inner magnetic core 31a, the second inner magnetic core 31b, and the third inner magnetic core 31c in the first direction. The first inner magnetic core 31a is fastened to the first base 11, and the third inner magnetic core 31c is fastened to the second base 21. The second inner magnetic core 31b is disposed between the first inner magnetic core 31a and the third inner magnetic core 3c. The air air-gap 41 is disposed between the second inner magnetic core 31b and the third inner magnetic core 31c. The solid air-gap 42 is disposed between the first inner magnetic core 31a and the second inner magnetic core 31b. It may be understood that the second inner magnetic core 31b is located between the air air-gap 41 and the solid air-gap 42.

Figure 4:
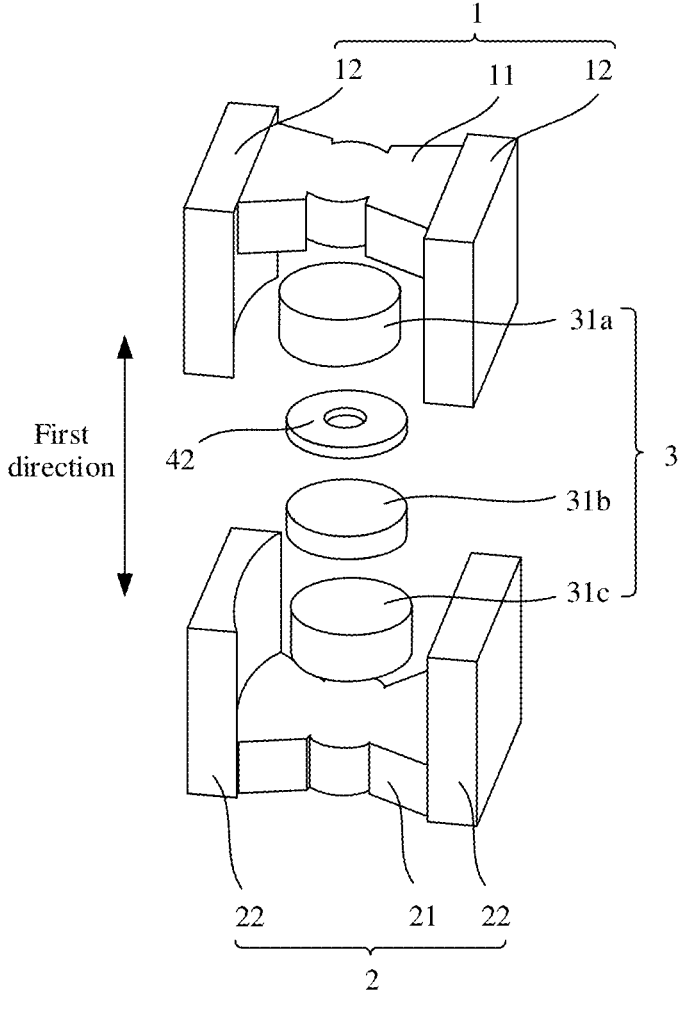
FIG. 4 is an exploded view of an inductor according to an embodiment.

As shown in FIG. 4, the first outer magnetic core 1 and the second outer magnetic core 2 are disposed opposite to each other in the first direction. The first outer magnetic core 1 includes the first base 11 and the two first side columns 12 connected to the two sides of the first base 11, and the second outer magnetic core 2 includes the second base 21 and the two second side columns 22 connected to the second base 21. The magnetic core middle column 3 is connected between the first base 11 and the second base 21, and the magnetic core middle column 3 includes the first inner magnetic core 31a, the second inner magnetic core 31b, and the third inner magnetic core 31c in the first direction. A solid air-gap 42 is disposed between the first inner magnetic core 31a and the second inner magnetic core 31b. For a structure of the solid air-gap 42, refer to FIG. 5.

Figure 5:
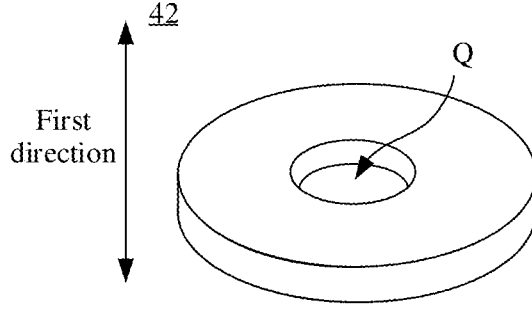
FIG. 5 is a schematic diagram of a structure of a solid air-gap of an inductor according to an embodiment.

As shown in FIG. 5, a hollow region Q that penetrates through the solid air-gap 42 in the first direction is disposed in a center of the solid air-gap 42. In this embodiment, the hollow region Q is cylindrical, an orthographic projection that is of the hollow region Q and that is on the first outer magnetic core 1 or the second outer magnetic core 2 is a circle, and a center of the circle of the circular projection is located on the axis of the magnetic core middle column 3. The hollow region Q and the magnetic core middle column 3 are coaxial, that is, an axis of the hollow region Q is collinear with the axis of the magnetic core middle column 3. It may be understood that the hollow region Q may alternatively be in another shape. A circumferential surface of the solid air-gap 42 may be flush with a circumferential surface of the magnetic core middle column 3, so that the solid air-gap 42 can be aligned with the circumferential surface of the magnetic core middle column 3. This helps the coil winding 6 be disposed around the winding unit R.

A magnetic induction intensity is a quantity of magnetic induction lines that can pass through per unit area, and the unit area is perpendicular to the first direction shown in FIG. 4 and FIG. 5. Due to existence of the hollow region Q, a magnetic induction intensity of the solid air-gap 42 is greater than a magnetic induction intensity of the magnetic core middle column 3. When a current of the coil winding 6 is small, and a magnetic flux in the solid air-gap 42 is not saturated, the solid air-gap 42 performs a magnetic conduction function. In this case, a total air-gap of the magnetic core 10 is equivalent to the air air-gap 41. When a current of the coil winding 6 increases, and a magnetic flux in the solid air-gap 42 is saturated, the magnetic flux in the solid air-gap 42 attenuates rapidly, and the solid air-gap 42 functions as the air air-gap. In this case, a total air-gap of the magnetic core 10 is equivalent to a superposition of the air air-gap 41 and the solid air-gap 42. Herein, the solid air-gap 42 is equivalent to a magnetic closed ring, so that the solid air-gap 42 can reduce an eddy current loss that is generated due to a leakage flux and that is on a surrounding coil winding.

Figure 6A:
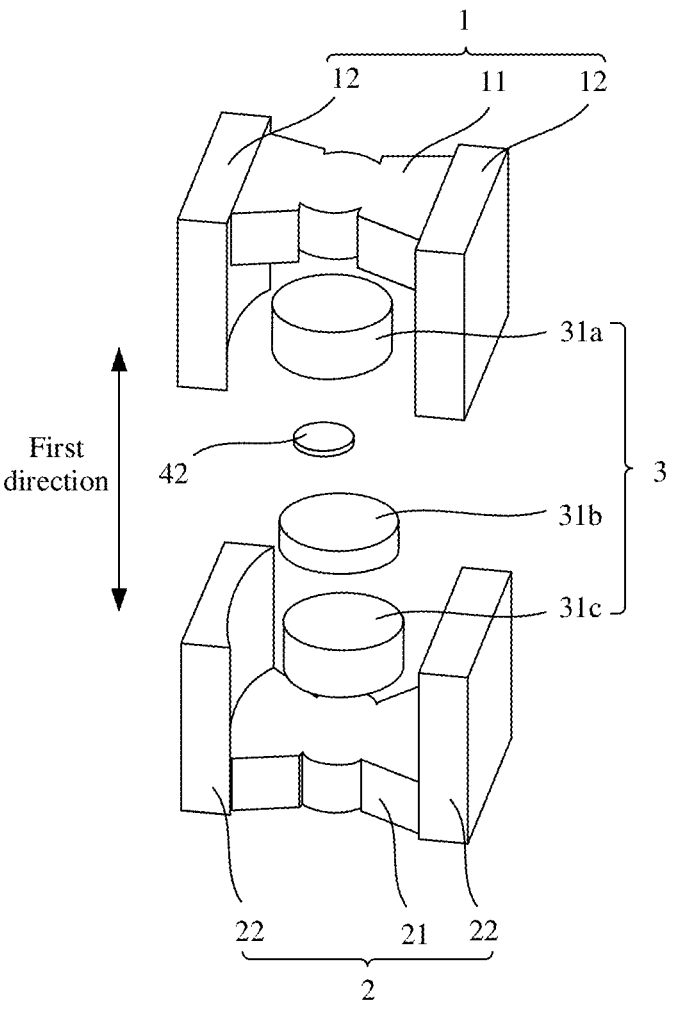
FIG. 6a is an exploded view of an inductor according to an embodiment.

As shown in FIG. 6a, a structure of the magnetic core 10 is similar to a structure of the magnetic core 10 shown in FIG. 4. A difference lies in that the solid air-gap 42 in the magnetic core 10 shown in FIG. 6a is a pie shape, and a radial size (a size perpendicular to the first direction) of the solid air-gap 42 is less than a radial size of the magnetic core middle column 3. A smaller radial size makes the magnetic induction intensity of the solid air-gap 42 greater than the magnetic induction intensity of the magnetic core middle column 3. When the magnetic flux in the solid air-gap 42 is not in a saturation state, the solid air-gap 42 can perform the magnetic conduction function. When the magnetic flux in the solid air-gap 42 is saturated, the magnetic flux in the solid air-gap 42 attenuates rapidly, and the solid air-gap 42 functions as the air air-gap.

Figure 6B:
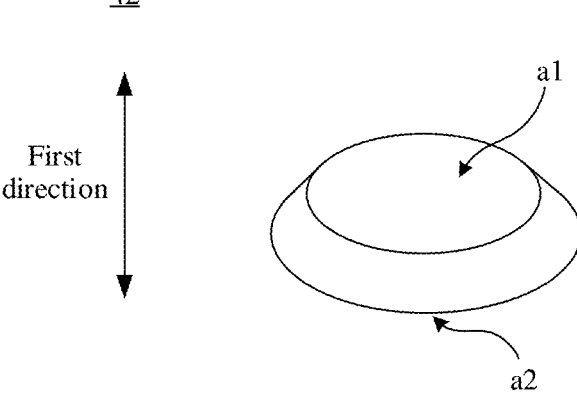
FIG. 6b and FIG. 6c each are a schematic diagram of a structure of a solid air-gap of an inductor according to an embodiment.

FIG. 6b is a schematic diagram of a solid air-gap in an inductor according to an embodiment. As shown in FIG. 6b, the solid air-gap 42 has a first surface a1 and a second surface a2 that are parallel to each other in the first direction, and a radial size of the first surface a1 is less than a radial size of the second surface a2. The radial size of the second surface a2 may be less than or equal to the radial size of the magnetic core middle column 3. It may be understood that an included angle may alternatively be formed between the first surface a1 and the second surface a2, that is, the first surface a1 is not parallel to the second surface a2.

Figure 6C:
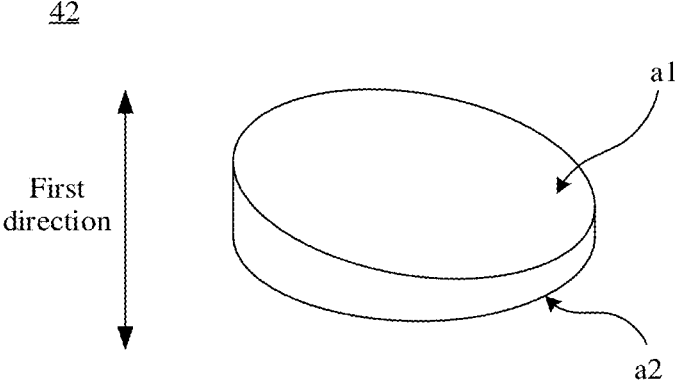

FIG. 6c is a schematic diagram of a solid air-gap in an inductor according to an embodiment. As shown in FIG. 6c, the solid air-gap 42 has a first surface a1 and a second surface a2 in the first direction, and an included angle is formed between the first surface a1 and the second surface a2, that is, the first surface a1 is not parallel to the second surface a2. A radial size of the second surface a2 may be less than the radial size of the magnetic core middle column 3.

Figure 7A:
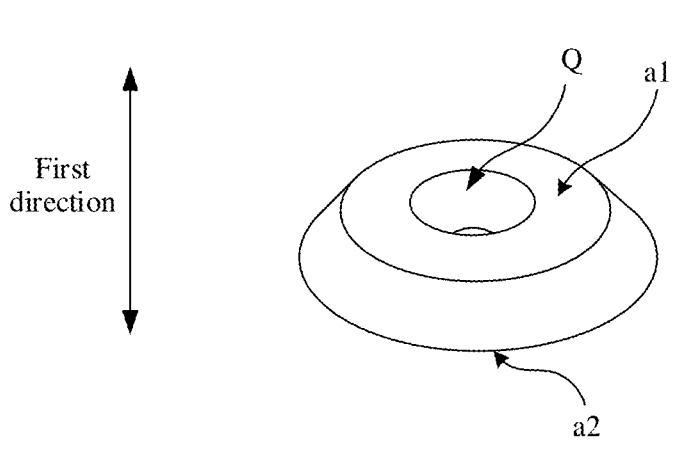
FIG. 7a and FIG. 7b each are a schematic diagram of a structure of a solid air-gap of an inductor according to an embodiment.

As shown in FIG. 5 and FIG. 6b, a structure of the solid air-gap 42 may alternatively be shown in FIG. 7a. The solid air-gap 42 has the first surface a1 and the second surface a2 that are parallel to each other. The solid air-gap 42 has the hollow region Q that penetrates through the first surface a1 and the second surface a2. In the first direction, the radial size of the first surface a1 is less than the radial size of the second surface a2, and the radial size of the second surface a2 may be less than the radial size of the magnetic core middle column 3. It may be understood that an included angle may alternatively be formed between the first surface a1 and the second surface a2, that is, the first surface a1 is not parallel to the second surface a2.

Figure 7B:
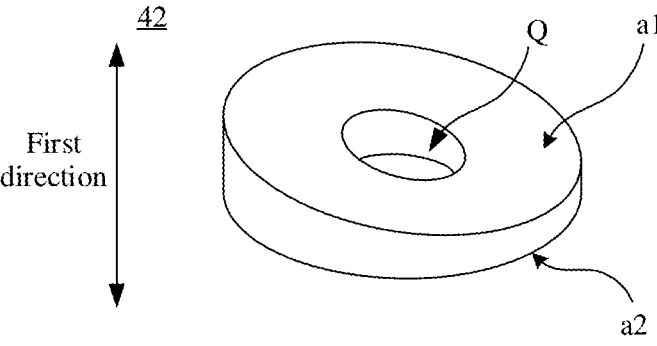

As shown in FIG. 5 and FIG. 6c, a structure of the solid air-gap 42 may alternatively be shown in FIG. 7b. The solid air-gap 42 has the first surface a1 and the second surface a2, and an included angle is formed between the first surface a1 and the second surface a2. In the first direction, the solid air-gap 42 has the hollow region Q that penetrates through the first surface a1 and the second surface a2. In this implementation, the radial size of the second surface a2 of the solid air-gap 42 may be less than or equal to the radial size of the magnetic core middle column 3.

It should be understood that the foregoing embodiment merely describes the structure of the solid air-gap 42 by using simple examples. The structure of the solid air-gap 42 may be implemented in another manner, for example, a cube, a polyhedron, or even an irregular shape, provided that the magnetic induction intensity of the solid air-gap 42 is greater than the magnetic induction intensity of the magnetic core middle column 3. In this way, the solid air-gap 42 performs the magnetic conduction function or the functions of the air air-gap when the magnetic flux varies.

Figure 8:
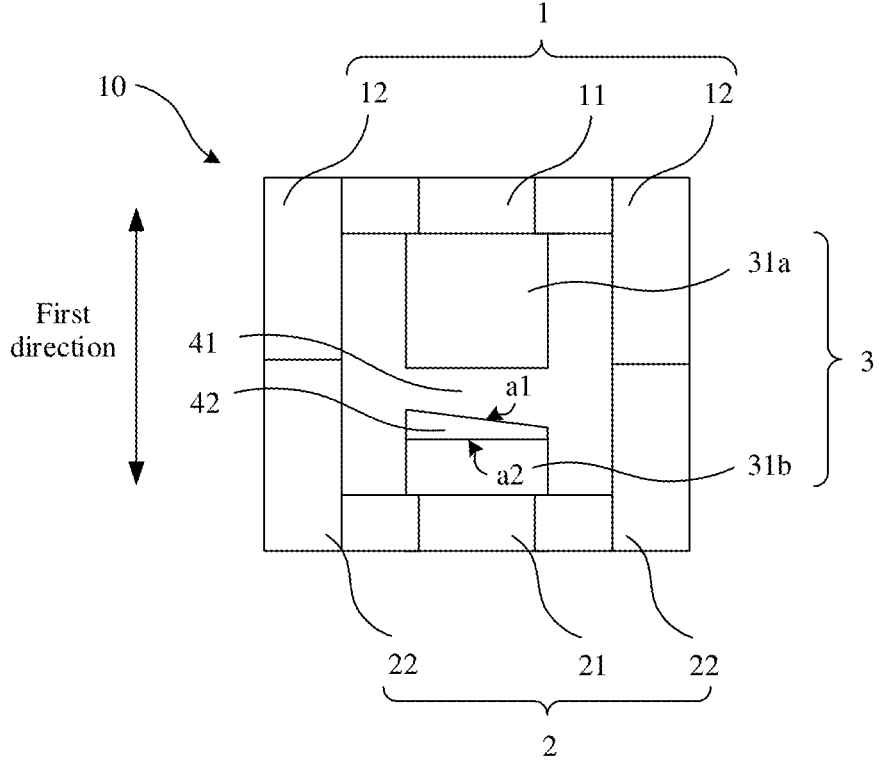
FIG. 8 is a main view of an inductor according to an embodiment.

FIG. 8 is a main view of an inductor according to an embodiment. For case of display, the coil winding 6 of the inductor is hidden in the figure. As shown in FIG. 8, the first outer magnetic core 1 and the second outer magnetic core 2 are disposed opposite to each other in the first direction. The first outer magnetic core 1 includes the first base 11 and the two first side columns 12 connected to the two sides of the first base 11, and the second outer magnetic core 2 includes the second base 21 and the two second side columns 22 connected to the second base 21. The magnetic core middle column 3 is connected between the first base 11 and the second base 21. The magnetic core middle column 3 includes the first inner magnetic core 31a and the second inner magnetic core 31b in the first direction. The first inner magnetic core 31a is fastened to the first base 11, and the second inner magnetic core 31b is fastened to the second base 21. The air air-gap 41 is adjacent to the solid air-gap 42, and is disposed between the first inner magnetic core 31a and the second inner magnetic core 31b. The solid air-gap 42 is disposed on a side that is of the second inner magnetic core 31b and that faces the first inner magnetic core 31a, the second surface a2 of the solid air-gap 42 is fastened to a surface that is of the second inner magnetic core 31b and that faces the first inner magnetic core 31a, and the air air-gap 41 is disposed between the solid air-gap 42 and the first inner magnetic core 31a. It may be understood that the solid air-gap 42 may alternatively be disposed on a side that is of the first inner magnetic core 31a and that faces the second inner magnetic core 31b, the second surface a2 of the solid air-gap 42 is fastened to a surface that is of the first inner magnetic core 31a and that faces the second inner magnetic core 31b, and the air air-gap 41 is disposed between the solid air-gap 42 and the second inner magnetic core 31b.

Figure 9:
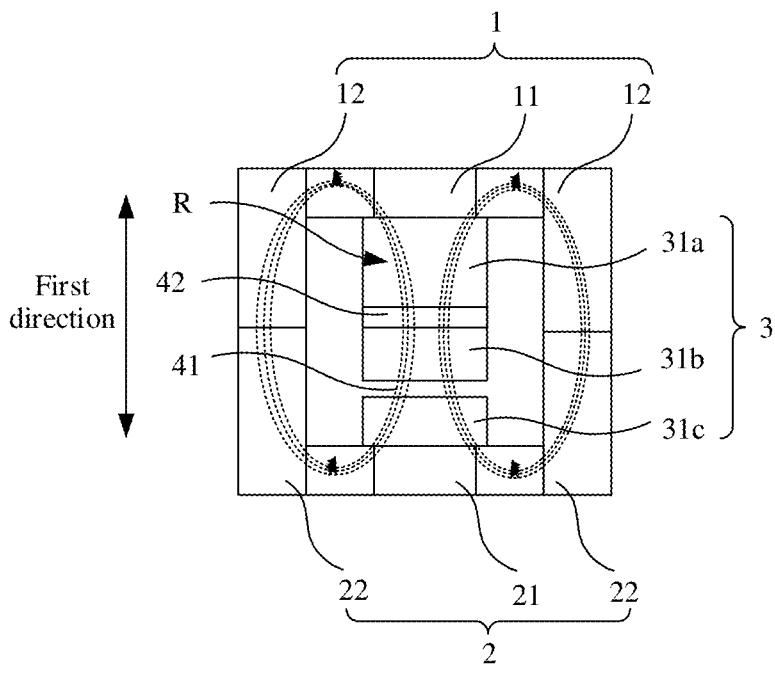
FIG. 9 is a schematic diagram of a distribution of magnetic induction lines of an inductor according to an embodiment.

FIG. 9 is a schematic diagram of a distribution of magnetic induction lines of an inductor according to an embodiment. For case of display, the coil winding 6 of the inductor is hidden in the figure. For case of display, only three groups of magnetic induction lines are used as an example herein by using dashed lines, and arrow directions are merely an example. As shown in FIG. 9, after the coil winding 6 of the winding unit R is powered on, a plurality of magnetic induction lines pass through the magnetic core middle column 3 and the solid air-gap 42. Magnitude of the current of the coil winding 6 is positively correlated with the magnetic flux in the magnetic core 10 within a range. Therefore, when the current of the coil winding 6 increases, the magnetic flux in the magnetic core middle column 3 and the magnetic flux in the solid air-gap 42 increases accordingly. As described in the foregoing embodiment, the magnetic induction intensity of the solid air-gap 42 is less than the magnetic induction intensity of the magnetic core middle column 3. As the current of the coil winding 6 increases, the solid air-gap 42 is to be in a magnetic flux saturation state earlier than the magnetic core middle column 3. When the magnetic flux in the solid air-gap 42 is saturated, the magnetic flux in the solid air-gap 42 attenuates rapidly, and the solid air-gap 42 functions as the air air-gap. In other words, when the current of the coil winding 6 is small, the magnetic flux of the solid air-gap 42 is not saturated. Because the material of the solid air-gap 42 is a magnetic material, the solid air-gap 42 can perform the magnetic conduction function as the magnetic core middle column 3. In this case, a size of the total air-gap of the inductor is equal to a size of the air air-gap 41. When the current of the coil winding 6 increases, and the magnetic flux in the solid air-gap 42 is saturated, the magnetic flux in the solid air-gap 42 attenuates rapidly, and the solid air-gap 42 functions as the air air-gap. In this case, a size of the total air-gap of the inductor is equal to a superposition of a size of the air air-gap 41 and a size of the solid air-gap 42. The total air-gap of the inductor increases, and the inductance of the inductor decreases. It may be understood that the solid air-gap 42 of the inductor provided in this embodiment can perform the magnetic conduction function or the function of the air-gap as the magnetic flux varies. Therefore, the total air-gap of the inductor can vary as the current of the coil winding 6 varies, so that the inductance of the inductor can vary as the current of the coil winding 6 varies.

Figure 10A:
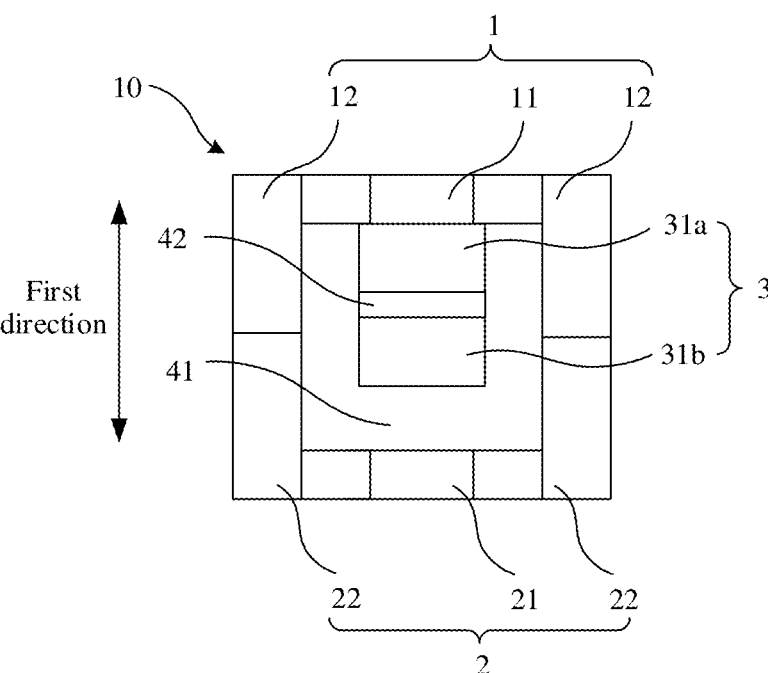
FIG. 10a and FIG. 10b each are a schematic diagram of a structure of an inductor according to an embodiment.
Figure 10B:
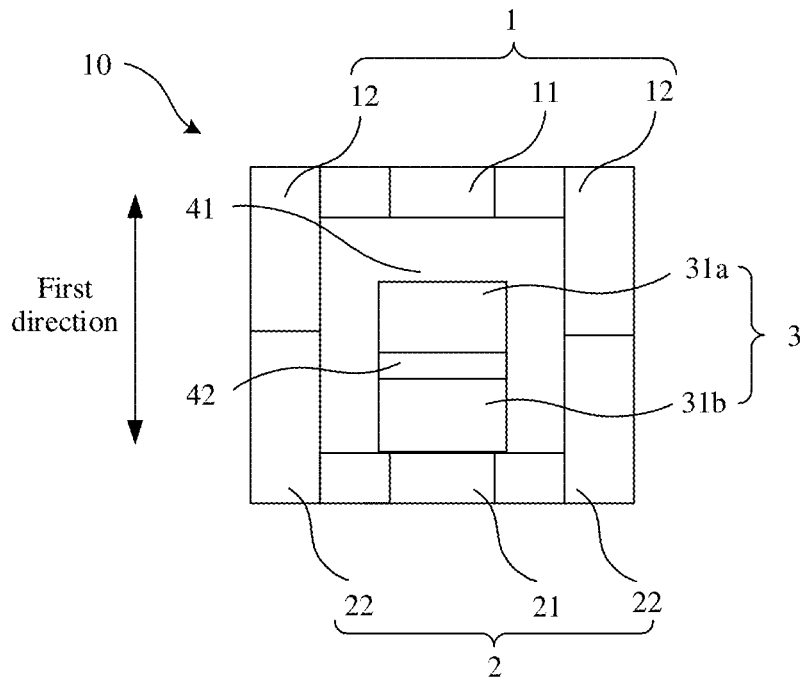

FIG. 10a and FIG. 10b each are a main view of an inductor according to an embodiment. For case of display, the coil winding 6 of the inductor is hidden in the figure. As shown in FIG. 10a and FIG. 10b, the first outer magnetic core 1 and the second outer magnetic core 2 are disposed opposite to each other in the first direction. The first outer magnetic core 1 includes the first base 11 and the two first side columns 12 connected to the two sides of the first base 11, and the second outer magnetic core 2 includes the second base 21 and the two second side columns 22 connected to the second base 21. The magnetic core middle column 3 may be fixedly connected to the first outer magnetic core 1 or the second outer magnetic core 2, and the air air-gap 41 may be formed between the magnetic core middle column 3 and the first outer magnetic core 1 or between the magnetic core middle column 3 and the second outer magnetic core 2. In FIG. 10a, the magnetic core middle column 3 includes the first inner magnetic core 31a and the second inner magnetic core 31b that are sequentially distributed in the first direction. The first inner magnetic core 31a is fastened to the first base 11 of the first outer magnetic core 1, the solid air-gap 42 is disposed between the first inner magnetic core 31a and the second inner magnetic core 31b, and the air air-gap 41 is formed between the second inner magnetic core 31b and the second base 21 of the second outer magnetic core 2. In FIG. 10b, the magnetic core middle column 3 includes the first inner magnetic core 31a and the second inner magnetic core 31b that are sequentially distributed in the first direction. The second inner magnetic core 31b is fastened to the second base 21 of the second outer magnetic core 2, the solid air-gap 42 is disposed between the first inner magnetic core 31a and the second inner magnetic core 31b, and the air air-gap 41 is formed between the first inner magnetic core 31a and the first base 11 of the first outer magnetic core 1. It may be understood that, in this embodiment, the magnetic core middle column 3 may alternatively include more inner magnetic cores, and an air air-gap and/or a solid air-gap may be disposed between adjacent inner magnetic cores. The air air-gap 41 and the solid air-gap 42 may be respectively disposed on two sides that are of an inner magnetic core and that are in the first direction, and the air air-gap 41 and the solid air-gap 42 may alternatively be adjacently disposed between two inner magnetic cores.

Figure 11A:
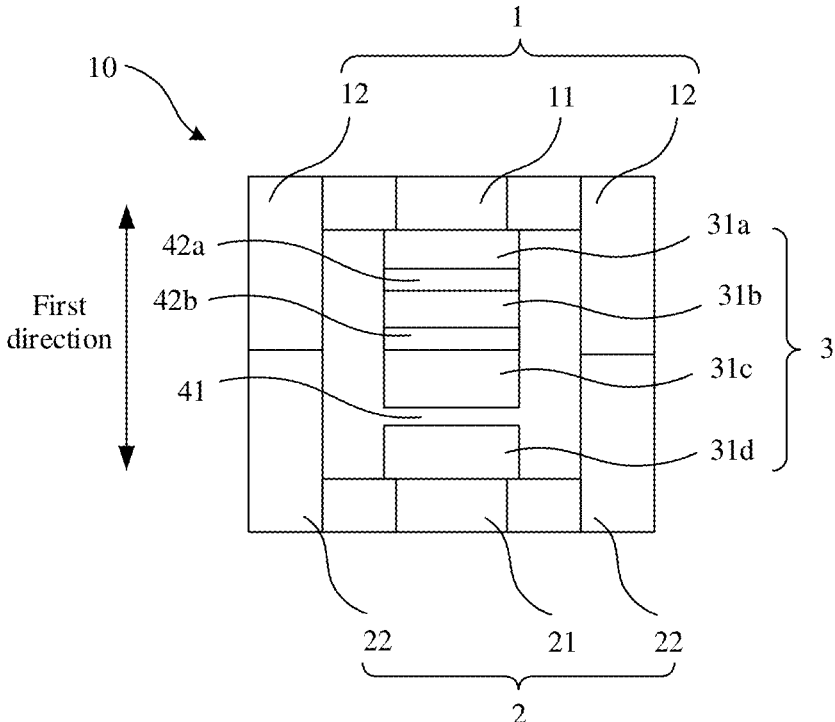
FIG. 11a to FIG. 11c each are a schematic diagram of a structure of an inductor according to an embodiment.
Figure 11B:
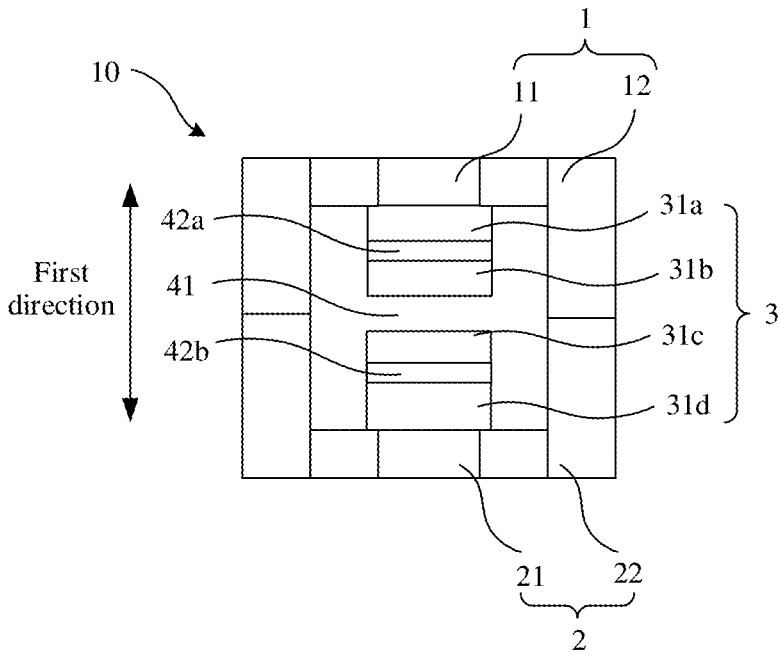
Figure 11C:
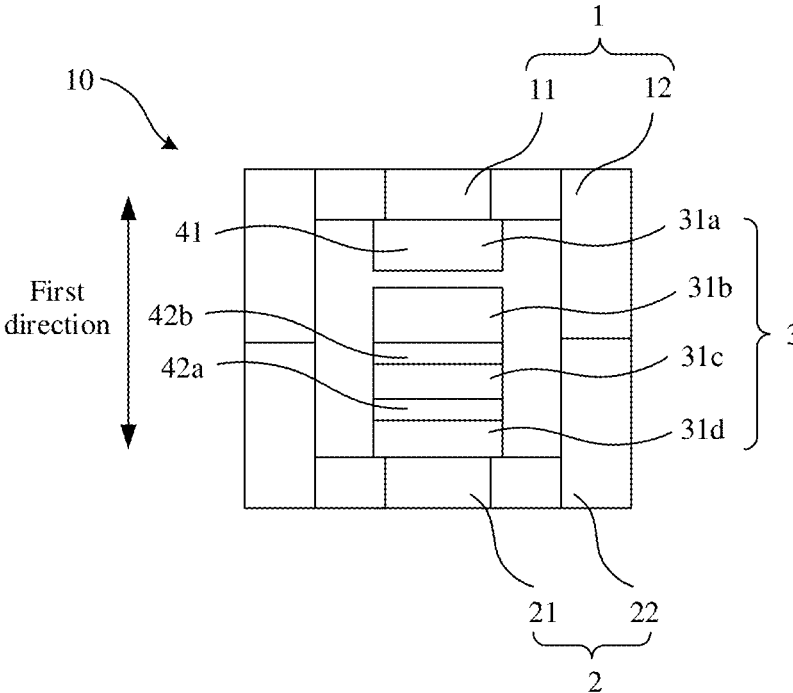

FIG. 11a, FIG. 11b, and FIG. 11c each are a main view of an inductor according to an embodiment. For case of display, the coil winding 6 of the inductor is hidden in the figure. As shown in FIG. 11a to FIG. 11c, the first outer magnetic core 1 and the second outer magnetic core 2 are opposite to each other in the first direction. The first outer magnetic core 1 includes the first base 11 and the two first side columns 12 connected to the two sides of the first base 11, and the second outer magnetic core 2 includes the second base 21 and the two second side columns 22 connected to the second base 21. The magnetic core middle column 3 is disposed between the first base 11 and the second base 21.

In FIG. 11a, the magnetic core middle column 3a includes the first inner magnetic core 31a, the second inner magnetic core 31b, the third inner magnetic core 31c, and the fourth inner magnetic core 31d that are sequentially distributed in the first direction. The first inner magnetic core 31a is fastened to the first base 11, and the fourth inner magnetic core 31d is fastened to the second base 21. A solid air-gap 42a is disposed between the first inner magnetic core 31a and the second inner magnetic core 31b. A solid air-gap 42b is disposed between the second inner magnetic core 31b and the third inner magnetic core 31c. An air air-gap 41 is formed between the third inner magnetic core 31c and the fourth inner magnetic core 31d.

In FIG. 11b, the magnetic core middle column 3a includes the first inner magnetic core 31a, the second inner magnetic core 31b, the third inner magnetic core 31c, and the fourth inner magnetic core 31d that are sequentially distributed in the first direction. The first inner magnetic core 31a is fastened to the first base 11, and the fourth inner magnetic core 31d is fastened to the second base 21. A solid air-gap 42a is disposed between the first inner magnetic core 31a and the second inner magnetic core 31b. A solid air-gap 42b is disposed between the third inner magnetic core 31c and the fourth inner magnetic core 31d. An air air-gap 41 is formed between the second inner magnetic core 31b and the third inner magnetic core 31c.

In FIG. 11c, the magnetic core middle column 3a includes the first inner magnetic core 31a, the second inner magnetic core 31b, the third inner magnetic core 31c, and the fourth inner magnetic core 31d that are sequentially distributed in the first direction. The first inner magnetic core 31a is fastened to the first base 11, and the fourth inner magnetic core 31d is fastened to the second base 21. An air air-gap 41 is disposed between the first inner magnetic core 31a and the second inner magnetic core 31b. A solid air-gap 42b is disposed between the second inner magnetic core 31b and the third inner magnetic core 31c. A solid air-gap 42a is disposed between the third inner magnetic core 31c and the fourth inner magnetic core 31d.

The air-gap of the inductor provided in this embodiment includes a combination of the air air-gap 41 and the solid air-gap 42. The combination of the air air-gap 41 and the solid air-gap 42 may be one solid air-gap 42 and a plurality of air air-gaps 41 or may be a plurality of solid air-gaps 42 and one air air-gap 41 or may be a plurality of solid air-gaps 42 and a plurality of air air-gaps 41. It may be understood that the air air-gap 41 and the solid air-gap 42 may be adjacently disposed, or the air air-gap 41 and the solid air-gap 42 may be respectively disposed on two sides that are of an inner magnetic core and that are in the first direction.

The solid air-gap 42 of the inductor provided in embodiments can perform the magnetic conduction function or the function of the air-gap as the magnetic flux varies, so that the total air-gap of the inductor can vary as the current of the coil winding 6 varies. Further, the inductance of the inductor can vary as the current of the coil winding 6 varies. Therefore, the inductor provided in embodiments is used in the power factor correction circuit, the alternating current/direct current conversion circuit, and the power supply system, to improve efficiency of the power factor correction circuit, the alternating current/direct current conversion circuit, and the power supply system.

Correspondingly, embodiments further provide a power factor correction circuit, an alternating current/direct current conversion circuit, and a power supply system. For a structure of the power factor correction circuit provided in embodiments, refer to the power factor correction circuit 112 shown in FIG. 1b. A difference lies in that the inductor L1 in FIG. 1b may be replaced with the inductor provided in the foregoing embodiments. For a structure of the alternating current/direct current conversion circuit provided in embodiments, refer to the alternating current/direct current conversion circuit 110 shown in FIG. 1b. A difference lies in that the inductor L1 in FIG. 1b may be replaced with the inductor provided in the foregoing embodiments. For a structure of the power supply system provided in embodiments, refer to the power supply system 100 shown in FIG. 1a. A difference lies in that the inductor provided in the foregoing embodiments is used in the alternating current/direct current conversion circuit 110 in FIG. 1a.

In the critical conduction mode, when the power supply system 100 provided in embodiments runs in the light load phase, the current of the inductor L1 of the power factor correction circuit 112 in the alternating current/direct current conversion circuit 110 is small, the current of the coil winding 6 of the inductor L1 is small, and the magnetic flux in the solid air-gap 42 of the inductor L1 is not saturated. The solid air-gap 42 can play the magnetic conduction function as the inner magnetic core 31. In this case, a size of the total air-gap of the inductor is equivalent to a size of the air air-gap 41. Therefore, when the power supply system 100 runs in the light load phase, the inductance of the inductor is large. This can reduce the on/off frequency of the power factor correction circuit 112, to reduce the on/off loss of the metal-oxide-semiconductor field-effect transistor. This is equivalent to improving efficiency of the power supply system in the light load phase, to improve efficiency of the power supply system 100. As the load of the power supply system 100 increases, the current of the inductor L1 of the power factor correction circuit 112 in the alternating current/direct current conversion circuit 110 increases, and the current of the coil winding 6 of the inductor L1 increases. When the magnetic flux in the solid air-gap 42 gradually increases to be saturated, the magnetic flux in the solid air-gap 42 attenuates rapidly. Further, the solid air-gap 42 functions as the air air-gap. In this case, the total air-gap of the inductor is equivalent to the superposition of the air air-gap 41 and the solid air-gap 42. The total air-gap of the inductor increases, and the inductance of the inductor decreases. Therefore, when the power supply system 100 runs in the heavy load phase, the inductance of the inductor is small, and the on/off frequency of the power factor correction circuit 112 can be increased, to avoid an abnormal sound caused by the fact that a frequency of the metal-oxide-semiconductor field-effect transistor switch is excessively low.

It may be understood that, in the power factor correction circuit and the alternating current/direct current conversion circuit provided in embodiments, in the critical conduction mode, when the power supply system is lightly loaded, the on/off frequency of the metal-oxide-semiconductor field-effect transistor switch can be reduced, to reduce the on/off loss of the metal-oxide-semiconductor field-effect transistor and optimize the efficiency of the power factor correction circuit in the light load phase in the power supply system. When the power supply system is heavily loaded, the on/off frequency of the metal-oxide-semiconductor field-effect transistor switch can be increased, to avoid an abnormal sound caused by a fact that a frequency of the metal-oxide-semiconductor field-effect transistor switch is excessively low.

It may be understood that, in the power supply system provided in embodiments, in the critical conduction mode, the power supply system has high operating efficiency in a light load phase. This improves the efficiency of the power supply system and meets a high-efficiency power supply requirement.

The foregoing descriptions are merely embodiments but are not intended as limiting. Any variation or replacement readily figured out by a person skilled in the art shall fall within the scope of the embodiments.

What is claimed is:

1. An inductor, comprising:
   a coil winding and a magnetic core, wherein the magnetic core comprises a first outer magnetic core, a second outer magnetic core, and a winding unit; and
   the first outer magnetic core and the second outer magnetic core are disposed opposite to each other in a first direction, the winding unit is disposed between the first outer magnetic core and the second outer magnetic core, the coil winding is disposed around the winding unit, the winding unit comprises a magnetic core middle column and at least two air-gaps distributed in the first direction, and an axis of the magnetic core middle column is parallel to the first direction; and
   the at least two air-gaps comprise one air air-gap and at least one solid air-gap having a hollow structure, and a magnetic induction intensity of the at least one solid air-gap is greater than a magnetic induction intensity of the magnetic core middle column.

2. The inductor according to claim 1, wherein the magnetic core middle column is fixedly connected to the first outer magnetic core, and the air air-gap is formed between the magnetic core middle column and the second outer magnetic core; or the magnetic core middle column is fixedly connected to the second outer magnetic core, and the air air-gap is formed between the magnetic core middle column and the first outer magnetic core.

3. The inductor according to claim 1, wherein the magnetic core middle column comprises a first sub-column and a second sub-column, the first sub-column is fixedly connected to the first outer magnetic core, the second sub-column is fixedly connected to the second outer magnetic core, and the air air-gap is formed between the first sub-column and the second sub-column.

4. The inductor according to claim 1, wherein the air air-gap is adjacent to the at least one solid air-gap.

5. The inductor according to claim 1, wherein the magnetic core middle column comprises a plurality of inner magnetic cores, and the air air-gap and the at least one solid air-gap are respectively disposed on two sides that are of an inner magnetic core and that are in the first direction.

6. The inductor according to claim 1, wherein a hollow region that penetrates through the at least one solid air-gap in the first direction is in a center of the at least one solid air-gap.

7. The inductor according to claim 1, wherein a radial size that is of the at least one solid air-gap and that is perpendicular to the first direction is less than a radial size that is of the magnetic core middle column and that is perpendicular to the first direction.

8. The inductor according to claim 1, wherein the first outer magnetic core comprises a first base and two first side columns, the two first side columns are fastened to the first base and extend toward the second outer magnetic core, the second outer magnetic core comprises a second base and two second side columns, the two second side columns are fastened to the second base and extend toward the first outer magnetic core, and the two first side columns and the two second side columns are connected through fitting in a one-to-one correspondence.

9. A power factor correction circuit comprising a capacitor;

a metal-oxide-semiconductor field-effect transistor switch;

a diode; and an inductor, wherein the inductor comprises a coil winding and a magnetic core, the magnetic core comprises a first outer magnetic core, a second outer magnetic core, and a winding unit, the first outer magnetic core and the second outer magnetic core are disposed opposite to each other in a first direction, the winding unit is disposed between the first outer magnetic core and the second outer magnetic core, the coil winding is disposed around the winding unit, the winding unit comprises a magnetic core middle column and at least two air-gaps distributed in the first direction, an axis of the magnetic core middle column is parallel to the first direction, the at least two air-gaps comprise one air air-gap and at least one solid air-gap having a hollow structure, and a magnetic induction intensity of the at least one solid air-gap is greater than a magnetic induction intensity of the magnetic core middle column.

10. The power factor correction circuit according to claim 9, wherein the magnetic core middle column is fixedly connected to the first outer magnetic core, and the air air-gap is formed between the magnetic core middle column and the second outer magnetic core; or the magnetic core middle column is fixedly connected to the second outer magnetic core, and the air air-gap is formed between the magnetic core middle column and the first outer magnetic core.

11. The power factor correction circuit according to claim 9, wherein the magnetic core middle column comprises a first sub-column and a second sub-column, the first sub-column is fixedly connected to the first outer magnetic core, the second sub-column is fixedly connected to the second outer magnetic core, and the air air-gap is formed between the first sub-column and the second sub-column.

12. The power factor correction circuit according to claim 9, wherein the air air-gap is adjacent to the at least one solid air-gap.

13. The power factor correction circuit according to claim 9, wherein the magnetic core middle column comprises a plurality of inner magnetic cores, and the air air-gap and the at least one solid air-gap are respectively disposed on two sides that are of an inner magnetic core and that are in the first direction.

14. The power factor correction circuit according to claim 9, wherein a hollow region that penetrates through the at least one solid air-gap in the first direction is in a center of the at least one solid air-gap.

15. The power factor correction circuit according to claim 9, wherein a radial size that is of the at least one solid air-gap and that is perpendicular to the first direction is less than a radial size that is of the magnetic core middle column and that is perpendicular to the first direction.

16. The power factor correction circuit according to claim 9, wherein the first outer magnetic core comprises a first base and two first side columns, the two first side columns are fastened to the first base and extend toward the second outer magnetic core, the second outer magnetic core comprises a second base and two second side columns, the two second side columns are fastened to the second base and extend toward the first outer magnetic core; and the two first side columns and the two second side columns are connected through fitting in a one-to-one correspondence.

17. A power supply system comprising:

an alternating current/direct current conversion circuit;

a direct current voltage transformation circuit; and a control circuit, wherein the alternating current/direct current conversion circuit comprises a rectifier circuit and a power factor correction circuit, the power factor correction circuit comprises a capacitor, a metal-oxide-semiconductor field-effect transistor switch, a diode, and an inductor, the inductor comprises a coil winding and a magnetic core, wherein the magnetic core comprises a first outer magnetic core, a second outer magnetic core, and a winding unit; and the first outer magnetic core and the second outer magnetic core are disposed opposite to each other in a first direction, the winding unit is disposed between the first outer magnetic core and the second outer magnetic core, and the coil winding is disposed around the winding unit; and the winding unit comprises a magnetic core middle column and at least two air-gaps distributed in the first direction, and an axis of the magnetic core middle column is parallel to the first direction; the at least two air-gaps comprise one air air-gap and at least one solid air-gap having a hollow structure; and a magnetic induction intensity of the at least one solid air-gap is greater than a magnetic induction intensity of the magnetic core middle column.

18. The power supply system according to claim 17, wherein the magnetic core middle column is fixedly connected to the first outer magnetic core, and the air air-gap is formed between the magnetic core middle column and the second outer magnetic core; or the magnetic core middle column is fixedly connected to the second outer magnetic core, and the air air-gap is formed between the magnetic core middle column and the first outer magnetic core.

19. The power supply system according to claim 17, wherein the magnetic core middle column comprises a first sub-column and a second sub-column, the first sub-column is fixedly connected to the first outer magnetic core, and the second sub-column is fixedly connected to the second outer magnetic core; and the air air-gap is formed between the first sub-column and the second sub-column.

20. The power supply system according to claim 17, wherein the air air-gap is adjacent to the at least one solid air-gap.

\*  \*  \*  \*  \*